Nov. 8, 1966   P. WENTZEL ET AL   3,284,619
QUANTIZING SYSTEM USED IN WEIGHING ROLLING RAIL VEHICLES
Filed March 24, 1961

INVENTORS
Peter Wentzel &
Karl Steinbach
BY Georgett Spencer
ATTORNEY

United States Patent Office 3,284,619
Patented Nov. 8, 1966

3,284,619
QUANTIZING SYSTEM USED IN WEIGHING ROLLING RAIL VEHICLES
Peter Wentzel, Munich, Germany, and Karl Steinbach, Alexandria, Va., assignors to Telefunken Aktiengesellschaft, Berlin.
Filed Mar. 24, 1961, Ser. No. 98,144
Claims priority, application Germany, Mar. 31, 1960, T 18,165
8 Claims. (Cl. 235—151.33)

The the present invention relates to a system for picking up and utilizing the maximum value of a quantized amount. More particularly, the present invention relates to such a system which is particularly adapted for use in railway switching yards using car retarders or rail brakes.

In switching yards using automatically controlled car retarders or rail brakes, it is at times necessary to measure the axle weights of a rolling car or cut and to utilize this measurement in the control of the brake. For this purpose, scales are used which, in any suitable manner, measure the deformation of the rail due to the weight and which produce a corresponding electrical output. This output reaches a maximum when the wheel in question rolls over the weighing point, which maximum serves as a measure of the wheel load to be determined. Thus, steps must be taken which enable this maximum to be recognized, i.e., means must be provided which are able to determine the instant at which the value of the output is to be picked up and made use of.

The same problem arises also when, in known manner, the output value of an electronic scale is to be quantized, i.e., converted into a discrete number of successive measurement ranges of predetermined size.

It is known to determine the above-mentioned instant at which the output is to be picked up by means of a signal generator which may, for example, be in the form of a rail contact arranged at the weighing point. It has been found that this raises a number of structural difficulties inasmuch as it is hardly possible to place the measuring device and the rail contact at the same point along the rail. It is also possible to differentiate the output values and to obtain the pick-up instant from the zero-point of the differentiated value. In either case, there arises the disadvantage that the determination of this pick-up instant becomes less accurate the slower the car runs.

It is, therefore, an object of the present invention to provide a system for picking up and utilizing the maximum value of a variable amount or quantity which is presented in quantized form, particularly the output value of an electronic scale for weighing rolling rail vehicles, which system overcomes the above disadvantage in that the accuracy of the determination of the instant is independent of speed fluctuations of the vehicle. Accordingly, the present invention resides in a system for picking up and utilizing the maximum value of a variable amount, which system comprises a quantizing circuit having a plurality of comparators each of which has an output, a storage register having input means connected to the outputs of the comparators, these input means being such that the output of the comparators can be fed to the storage register only upon the generation of a write-in signal, and transfer means connected to the ouputs of the comparators for generating a write-in signal when a signal appearing at the output of any responding comparator first disappears.

Additional objects and advantages of the present invention will become apparent upon consideration of the following description when taken in conjunction with the accompanying drawings, in which.

Figure 1:
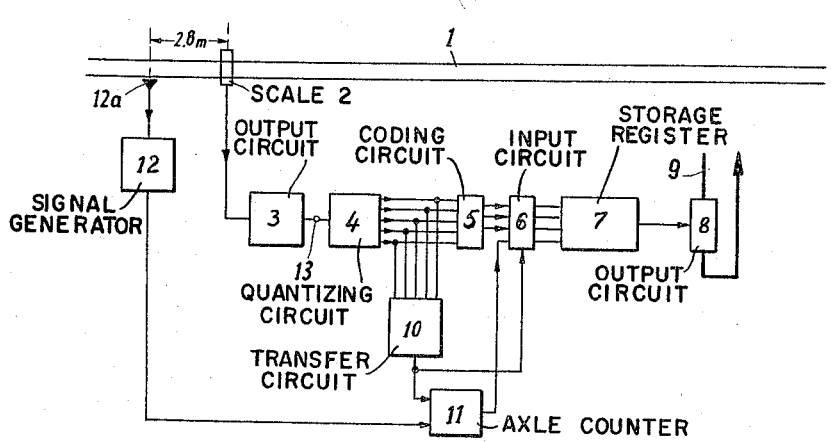
FIGURE 1 is a schematic representation of a system according to the present invention.

Referring now to the drawing, FIGURE 1 shows a system for use in conjunction with an electronic scale 2 arranged along a section of track 1. The output circuit 3 of the scale produces an output value which increases and decreases as the wheel to be weighed rolls toward and then away from the scale. This output value is quantized in a quantizing circuit 4 the output of which is fed to a coding circuit 5 from whence the output is fed, in coded form, to the input circuit 6 of a storage register 7. The output of the storage register 7 controls, via an output circuit 8, a quantity 9 which, in turn, is used to control the braking force of a conventional automatic car retarder or rail brake (not shown). The input circuit 6 of the storage register 7 is so designed, as will be further explained below, that the values which appear at the inputs will not be written into the storage register 7 until a write-in signal appears. This write-in signal is produced by a transfer circuit 10 whose inputs are connected with the outputs of the quantizing circuit 4. The transfer circuit 10 produces a write-in signal when one of the qauntizing stages in circuit 4 first returns, i.e., when the signal corresponding to this range goes, for example, from "1" to "0."

FIGURE 1 also shows an axle counter 11, to be described below, which axle counter is actuated by a signal generator 12 having a feeler 12a arranged along the track.

Figure 2:
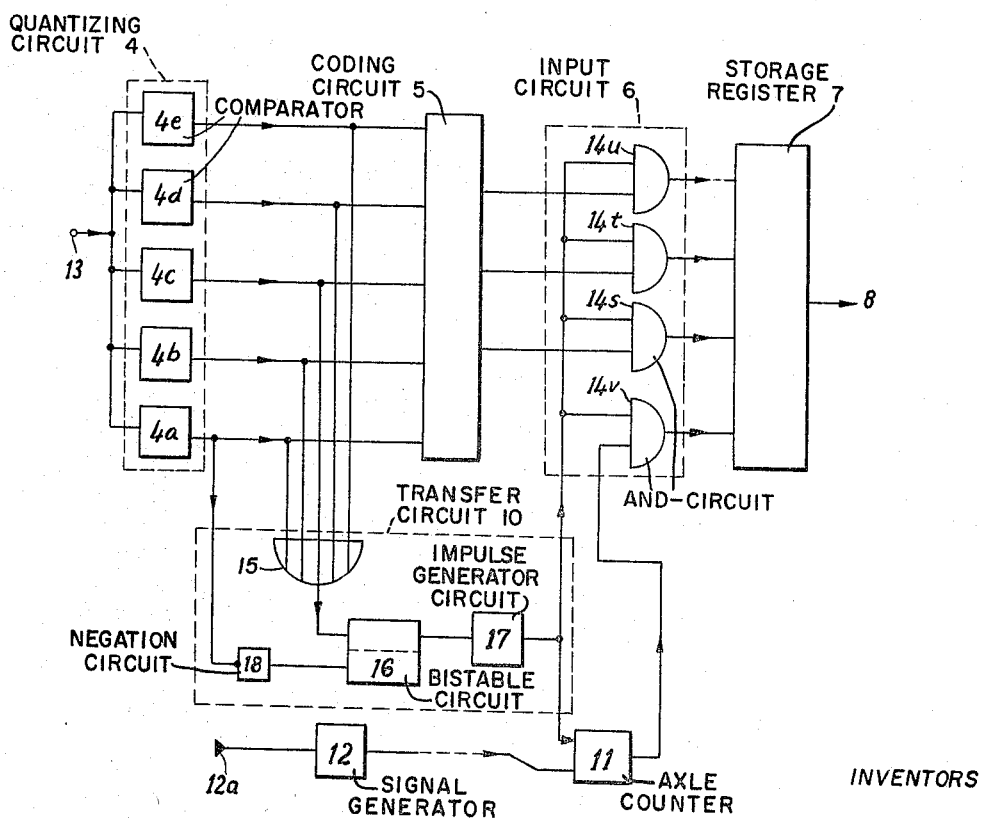
FIGURE 2 is a more detailed schematic illustration of certain features of the present invention.

FIGURE 2 shows, in diagrammatic form, an actual embodiment of the present invention. The quantizing circuit 4 comprises a suitable number, such as five, quantization stages, i.e., the amplitude comparators, 4a, 4b, 4c, 4d, 4e, whose inputs are connected to the output 13 of the output circuit 3. An output signal "1" appearing at one of the amplitude comparators means that the value of the input amplitude to be quantized is greater than the amplitude value to which the particular comparator is set; if the output signal is "0," this means that the value of the input amplitude is smaller than the set value. The five comparators are so adjusted that their output signals correspond to five consecutive weight ranges. If, for instance, the input value to be quantized is greater than the given reference value of the comparator 4c but smaller than the given reference value of the comparator 4d, there will appear, when a car rolls over the scale 2, a series of output signals "1" at the comparators 4a, 4b, 4c, 4b, 4a, with the output signals of the lower stages always remaining "1" while any higher-order stage puts out a "1."

The five outputs of the comparators are connected to the coding circuit 5, as well as to the inputs of the transfer circuit 10. It is, of course, also possible for these outputs to be connected directly with the input circuit 6 of the storage register 7, but the coding reduces the amount of the circuitry necessary for the storage register. The coding circuit may be so designed as to represent the five weight ranges by a three-bit code. Accordingly, the storage register has three inputs which enable it to receive the five weight ranges. Each of the storage register inputs has an AND-circuit 14s, 14t, 14u, connected ahead of it, one input of each of these AND-circuits being connected to a corresponding output of the coding circuit 5 and the other input being connected to receive the write-in signal.

The transfer circuit may include a so-called impulse-OR-circuit 15, a bistable circuit 16, and an impulse generator circuit 17. The inputs of the circuit 15 are connected with the outputs of the comparators 4a, 4b, 44c, 4d, 4e, respectively, the circuit 15 being so designed that a trigger signal will appear at its output whenever the output signal of one of the comparators disappears. This is brought about by the decaying flank of the output signal involved. Thus, in the above case, a trigger impulse would be applied to the first input of the bistable circuit 16 whenever the values at comparators 4c, 4b, 4a disappear. The first of these impulses flips the circuit 16 out of its first stable position into its second stable position; the subsequent impulses will have no effect. As a result of this change of position of the circuit 16, the impulse generator circuit 17 connected to the output of the circuit 16 is made to produce a write-in impulse to each of the AND-circuits 14s, 14t, 14u. This impulse generator circuit can simply be a differentiating element, or it can be constituted by a monostable multivibrator. The bistable circuit 16 is reset into its first stable position whenever the comparator 4a, which corresponds to the lowest value range, is activated upon the occurrence of a new measurement. To accomplish this, the output of the comparator 4a is connected to the second input of the bistable circuit 16 by way of a negation circuit 18. This circuit 18 generates the complement of the output value of the comparator 4a, i.e., the signal produced by the circuit 18 disappears when comparator 4a is energized, and the decaying flank of this signal flips the circuit 16 back into its first stable position. The impulse generator circuit 17 is not affected by this.

The AND-circuits 14s, 14t, 14u, may be designed, in a manner well known in the art, such that the applied values are stored for short periods. This is necessary because the write-in signal is produced only by the trailing flank of the first disappearing signal of the comparators 4. Thus, thanks to the storage effect of the AND-circuits, the values applied prior to the occurrence of the write-in signal will still have a substantial part of their amplitude when this write-in signal is applied to the AND-circuits. These values, which correspond to the maximum of the quantized measurement to be picked up, are thus written into the storage register.

It is known, in automatic rail brakes which are controlled in response to the weight of the cars, to counteract the effect of the short distances between the wheels on the same truck by increasing the braking force. In order to determine this distance, an arrangement may be used which comprises two signalling devices, cooperating, for example, with rail contacts, and a counter having two inputs one of which counts the impulses of the first signalling device by advancing the counter, and the other of which inputs subtracts the impulses of the second signalling device by retreating the counter. The position of the counter thus always corresponds to the number of axles located between the two rail contacts. If the distance between the two rail contacts is selected to be smaller than the distance between the wheels on a railway truck, a four-axle car (with two trucks) can bring the counter to "2," whereas two and three-axle cars which instead of trucks have single axles can advance the counter only to "1."

According to a further feature of the present invention, one of the two signalling devices can be eliminated by placing the other signalling device 12, or its contact or feeler 12a, either ahead of or behind the scale 2—which must in any event be provided—a distance as set forth above, namely, a distance of the order of about 2.8 meters. The axle counter 11 will then have applied to one of its inputs the write-in signal of the transfer circuit 10, as, for example, the impulse produced by the impulse generator circuit 17, the other input of the counter 11 being connected to the signal generator 12. An output of the counter which corresponds to "2" can then be applied to another input of the storage register 7, in a manner similar to that in which the outputs of the comparators or of the coding circuit are connected to this storage register, i.e., the output of the counter 11 may be connected to one input of an AND-circuit 14v whose other input is connected to the impulse generator circuit 17 and whose output is connected to the storage register 7. This register is then so designed that its output will, in an appropriate manner, be modified if a car having trucks has passed the scale.

It will be understood that the above description of the present invention is susceptible to various modifications, changes and adaptations, and the same are intended to be comprehended within the meaning and range of equivalents of the appended claims.

We claim:

1. In combination with a scale arranged along a railroad track over which may pass rail vehicles, including rail vehicles having multiple-axle railway trucks, a system for picking up and utilizing the maximum value of a varying amount, the latter being the output of the scale for measuring the weight of rail vehicles moving over the railway track, said system comprising, in combination: a quantizing circuit for receiving the varying amount and quantizing the same, said quantizing circuit having a plurality of comparators each of which has an output; a storage register having input means connected to said outputs of said comparators, said input means being such that the output of said comparators can be fed to said storage register only upon the generation of a write-in signal; transfer means connected to said outputs of said comparators and to the said input means for generating a write-in signal when a signal appearing at the output of any responding comparator first disappears; an axle counter having a first input which, in response to a signal, advances said counter and a second input which, in response to a signal, retreats said counter, one of said inputs being connected to the output of said transfer means and responding to a write-in signal generated thereby; and signal generator means arranged along the track and being spaced from said scale a distance less than the distance between the wheels of a railway truck, said signal generator means responding to a wheel rolling over the track at the point at which said signal generator means are arranged and being connected to the other of said inputs of said axle counter, whereby said counter counts the number of axles between said signal generator means and said scale and, when two axles are presented simultaneously, produces a signal indicative of the presence of a vehicle truck.

2. A system as defined in claim 1 wherein the output of said axle counter is connected to said storage register in a manner similar to that in which the outputs of said comparators are connected to said storage register.

3. A system for picking up and utilizing the maximum value of a varying amount, comprising, in combination: a quantizing circuit for receiving the varying amount and quantizing the same, said quantizing circuit having a plurality of comparators each of which has an output; a storage register having input means connected to said outputs of said comparators, said input means being such that the output of said comparators can be fed to said storage register only upon the generation of a write-in signal; and transfer means connected to said outputs of said comparators and to the said input means for generating a write-in signal when a signal appearing at the output of any responding comparator first disappears.

4. A system as defined in claim 3, further comprising a coding circuit interposed between said quantizing circuit and said storage register.

5. A system as defined in claim 3 wherein said transfer means comprise: an impulse-OR-circuit having a plurality of inputs connected, respectively, to said outputs of said comparators; a bistable circuit having a first input connected to the output of said impulse-OR-circuit; and an impulse generator circuit having an input connected to the output of said bistable circuit and an output connected with said input means of said storage register, said impulse-OR-circuit feeding a trigger impulse to said bistable circuit whenever a signal appearing at the output of any of said responding comparators disappears, the first trigger impulse thus fed to said bistable circuit flipping the latter from its first stable position to its second stable position, and said impulse generator circuit, as a result of this flipping, thus producing said write-in signal.

6. A system as defined in claim 5 wherein said bistable circuit has a second input connected to the lowest of said comparators, whereby the leading flank of the subsequent signal appearing at the output of said lowest comparator returns said bistable circuit to the first stable position.

7. A system as defined in claim 3 wherein said storage register comprises an input circuit having a plurality of AND-circuits corresponding in number to each input of said storage register, one input of each AND-circuit being connected to said quantizing circuit and another input of each AND-circuit being connected to the output of said transfer means, whereby a write-in signal generated by the latter is fed to said AND-circuits.

8. In combination with a weighing device arranged along a railroad track over which may pass rail vehicles, including rail vehicles having multiple-axle railway trucks, a system as defined in claim 3 wherein said varying amount is the output of a scale for measuring the weight of rail vehicles moving over the railway track.

References Cited by the Examiner

UNITED STATES PATENTS

| 2,701,301 | 2/1955 | Mullarkey | 246—247 |
| 2,918,657 | 12/1959 | Crampton et al. | 340—347 |
| 3,071,763 | 1/1963 | Welsh et al. | 340—347 |
| 3,133,279 | 5/1964 | Spaulding et al. | 340—347 |

OTHER REFERENCES

Millman, J. et al. Pulse and Digital Circuits. New York, McGraw-Hill, 1956, pages 394–397. (Fig. 13–3.)

MALCOLM A. MORRISON, *Primary Examiner.*

IRVING L. SRAGOW, *Examiner.*

I. KESCHNER, L. W. MASSEY, *Assistant Examiners.*